Aug. 18, 1970 G. D. BUKOVICH ETAL 3,525,087

FLEXIBLE MAGNETIC RECORD MEMBER PROFILE CORRECTION MEANS FOR ROTATING HEAD DRUM MEMORY SYSTEM

Filed Jan. 3, 1968 2 Sheets-Sheet 1

INVENTORS
GEORGE D. BUKOVICH
MATTHIAS J. GRUNDTNER
HARLEY W. SCHULTZ
GARY B. WOEHLER

BY Charles A. Johnson
ATTORNEY

INVENTORS
GEORGE D. BUKOVICH
MATTHIAS J. GRUNDTNER
HARLEY W. SCHULTZ
GARY B. WOEHLER
BY Charles A. Johnson
ATTORNEY United States Patent Office 3,525,087

Patented Aug. 18, 1970

3,525,087

FLEXIBLE MAGNETIC RECORD MEMBER PROFILE CORRECTION MEANS FOR ROTATING HEAD DRUM MEMORY SYSTEM

George D. Bukovich, Minneapolis, Matthias J. Grundtner and Harley W. Schultz, St. Paul, and Gary B. Woehler, Minneapolis, Minn., assignors to Sperry Rand Corporation, New York, N.Y., a corporation of Delaware Filed Jan. 3, 1968, Ser. No. 695,502

Int. Cl. G11b *5/60;* B65h *17/28*

U.S. Cl. 340—174.1 10 Claims

ABSTRACT OF THE DISCLOSURE

A vacuum system in a rotating-head magnetic memory system for use in correcting a flexible magnetic record member profile is described. The vacuum system described is utilized for bringing a magnetic tape record member into a uniform profile in a cooperative relationship with related magnetic transducers that are mounted in a rotor.

BACKGROUND OF THE INVENTION

Field of the invention

This invention relates generally to the field of magnetic recording and reading of data signals. More specifically, it relates to the system of magnetic recording that utilizes tranducers having relative motion with respect to a record medium for generating the fields to record, and for sensing the state of a recorded magnetic state to read. Still more specifically, it relates to a magnetic recording system wherein the record member is held relatively stationary, at least at one end, and the transducer, or transducers, is caused to move with respect to the record surface. Finally, this invention relates to a system for bringing the record member into a uniform profile across its width and along its length, when supported by a boundary layer of air, for cooperative relation with transducers that are mounted in a rotating support member.

Description of the prior art

The prior art has seen various attempts at recording signals on a magnetic record member by utilizing movable transducers. Some of the prior art systems have dealt with recording of analog signals, as in video recording, while others have dealt with recording of digital signals, as in data processing systems. The prior art is replete with various examples of magnetic tape systems having supply and take-up reels, with the tape in contact with movable transducers. These arrangements provide for holding tension on both ends of the tape as it is in cooperation with the movable transducers. It is also characteristic of the prior art that comparatively low relative rates of motion between the heads and surface are utilized. For the low rates of motion head contact with the record member along with end-tension on the magnetic tape were adequate. However, when such techniques are applied to high speed data processing uses the record member wear and slow speeds are not satisfactory.

In the rotatable magnetic drum or disk systems of the prior art, it has been found that the optimum storage density can be achieved by minimizing the spacing from the transducers to the moving record surface. When the transducers are fixed in a mount this spacing is characteristically in the range of 0.001 to 0.003 inch. This space allows for bearing or record surface imperfections and for differences in coefficients of expansion of various materials when the system is up to operating temperature. When the transducers are so mounted that they are supported in operation on the laminar layer of air caused by the moving record member this spacing can be improved. The later mode of operation is commonly referred to as "flying head" operation. This type of flying operation has the additional advantage of providing for the head to follow surface imperfections without contacting the record surface. Such drum or disk systems provide good access rate to store data items, but are limited to the storage capacity of the fixed record member surface. If files are generated that are to be stored for periods of time other than while in use, it is necessary to have an auxiliary storage, such as magnetic tape, to which the data can be transferred thereby allowing the disk or drum systems to be utilized in other computational and storage programs. This of course requires additional expensive equipment and requires valuable computer time to be utilized to effect the data transfers. It is necessary when the data is to be used again, to re-transfer it to the drum or disk by way of an auxiliary storage.

The prior art has also seen systems devised for utilizing magnetic tape strips as the record medium. In order to position these tape strips in relation to the transducers, it has been characteristic either to fix both ends of the magnetic tape, as described above, or to position the tape strips with a guide member against one surface while having the transducers operable with the other surface of the tape strip. Either of the systems is unnecessarily complex and expensive over the system of this invention. It is, of course, clear that the record medium life is extremely short when the transducer contacts the record member.

It has been recognized in the prior art that the record member profile tends to be a problem when a record member having a finite thickness is bent around a positioning device, such as a cylinder, for moving the record member into cooperative relationship with fixed transducers. One attempt in the prior art to correct the profile of the curved record member was to provide notches running along the length of the record member and disposed near the edges thereof. Such notching greatly increases the manufacturing costs of the record members. In a typical data processing system application, the magnetic record member, such as the tape strip, follows a curved linear path passing through the guide mechanism to the magnetic recording or reproducing head assembly. As mentioned above, it has been found in prior art systems that when the record member moves in a curved path it does not remain flat along its transverse direction, but tends to curve or curl at its edge because the longitudinal tension created by the curvature introduces lateral contraction and expansion. The record member is a planar body having a finite thickness, and when it is bent about a central axis normal to given side edges of the plane of the ramber the outer surface of the member stretches while the inner surface of the member compresses relative to the transverse midplane of the member. This disparity in tensile and compressive forces along the arc followed by the member leads to the observed lateral contraction or expansion of the member. The ultimate result is that the curved outer edges of the member bend outwardly, that is, upwardly away from the transverse midplane of the member in a direction opposite the direction of the bend of the member as a whole, to exhibit what is known as anti-elastic curvature.

Even in systems that provide for holding the record member body at both ends thereof, the problem of anti-elastic curvature can be appreciable when there is a relatively long span betwen gripping points. However, when the record member is gripped only at its leading edge, with the record member supported on a laminar film of air so as to leave a minute, but discernible spacing between the record member and a rotatable drum support, the record member thus represents a classic case of an elastic member acted upon by bending forces in such a manner as to create the anti-elastic curvature mentioned above.

In addition to the anti-elastic curvature just described, it has been found that as the rotatable transducer support member is rotated at relatively high rates the air that is trapped between the surface of the rotor and the under surface of the record member tends to be constricted such that the record member is bowed outwardly at the center of the record member along its length. This air flow is caused by the rapidly spinning rotor and can be considered to include both turbulent air and the more smoothly flowing so-called laminar air. For ease of reference, both of these types will be considered to be included in the terms 'boundary layer of air," or "laminar boundary layer of air," or "laminar air," or other such combinations, as used herein. It has been found, as described in a copending patent application of Bukovich et al., filed Jan. 3, 1968, with Ser No. 695,501, that by providing various treatments for the surface of the rotor, the profile of the magnetic member in the vicinity of the transducers can be much improved. Some of the systems described in this copending patent application for correcting the profile include milling or etching grooves in the surface of the rotor for dispersing some of the air which is normally trapped under the record member; and, alternatively, for providing a means of deflecting the flow of air immediately preceding the line of transducers such that the record member is also deflected in a manner to cause it to come into a corrected profile for cooperation with the transducers. Some of these deflecting means provided in a position leading the transducers include a bar or pair of bars mounted on the surface of the rotor, a slot milled along the length of the rotor, a curved ramp on the surface of the rotor, a flat on the rotor, or a spiral shaped rotor. In such systems, the speed of the rotor along with the rippling deflection of the record member which is otherwise held stationary at one end, tends to eliminate the bowing effect of the record member. While such systems have much improved over the notching of the edges of the record member, or other known systems of profile correction, they do include a problem of record member fatigue due to the continual flexing of the record member as the rotor sweeps around. Additionally, the specially formed rotor configurations are substantially more complex and expensive to manufacture than the cylindrical rotor which can be utilized with this invention. Finally, the precise form of the deflecting means selected for the rotor need not be matched to the physical dimensions of the record member when considered in conjunction with the speed of rotation of the rotor.

SUMMARY

The apparatus of this invention is for use in a magnetic storage system that employs a plurality of transducers mounted in a rotatable support member, referred to as a rotor. The read/write circuits and timing circuits, along with the transducer-selection circuits are mounted inside the rotor. The addressing signals are taken into the rotor, and the signals are carried out of the rotor, by way of coupling means, such as mercury slip-rings. The record member, comprising a tape strip having a magnetizable material coated on one side thereof, is positioned around the rotor and firmly clamped at one end. The other end is left free to float. As the rotor is caused to spin, the tape strip is supported on a boundary layer of air just out of contact with the surface of the rotor. In order to achieve optimum access rates, the rotor is rotated at a high speed. If the rotor has a completely cylindrical peripheral surface and no record member profile correction circuitry is employed, the high speed of rotation tends to cause the tape strip record member to bow outward, across its width, from the rotor forming a curved trough along the length of the tape strip. This bowing causes the read/write spacing of transducers near the center of the tape across its width and along the length of the rotor to be larger than the spacing near the edges of the tape strip. Such bowing can greatly affect the recording densities along the width of the record member. For instance, densities in the range of approximately 70 bits per inch have been noted near the center of the record member, with densities in the range of approximately 1000 bits per inch near the edges. Such an arrangement results in either diminishing the overall record member density to the minimum level, thereby greatly reducing the storage capacity, or in having different densities for different tracks. Neither of these situations is desirable. Additionally, bowing creates a problem in adjusting the read/write circuitry to achieve uniform signals to be transmitted out of the storage system, and decreases reliability of the system. It has been found that by providing a vacuum system to which the fixed ends of the record members are coupled, the bowing effect caused by the rotation of the rotor can be virtually eliminated by drawing off a portion of the air that would otherwise normally be trapped under the surface of the record members. By the addition of this relatively inexpensive devise, it is unnecessary to provide any of the profile correction devices mentioned above. That is, the tape strip record member can be formed from a flat stock and need not have edges that are notched. Further, the rotor can be formed in a perfectly cylindrical shape, and should preferably be so formed, thereby minimizing the manufacturing cost of the rotor. The various deflection means mentioned above, for use with the rotor, need not be provided thereby greatly decreasing the cost of manufacturing of the transducer supporting rotor. Finally, the vacuum system for bleeding off portions of the boundary layer of air is subject to being closely controlled. This allows for the memory system to utilize various sources of supply of magnetic record members which may vary in physical dimension such as thickness and flexibility. By merely adjusting the vacuum system these varying characteristic record members may be equally spaced from the surface of the rotor thereby giving a great deal of flexibility to to the total memory system. It should be noted that by the use of the vacuum system the record member is not caused to go through continuous deflection movements; instead it is caused to be drawn into a tight concentric profile just out of contact with the surface of the transducer supporting rotor. This profile extends virtually no fatigue-inducing deflections to the record member; hence, failure of the record member due to fatigue is virtually non-existent when using this invention.

A primary object of this invention, then, is to provide an improved memory system that utilizes one or more flexible record members in conjunction with movable transducers mounted in a rotatable support member. Another object is to provide an improved memory system wherein the record members are supported on a laminar boundary layer of air surrounding a rotatable transducer mount. Yet another object of the invention is to provide an improved memory system having apparatus for correcting the profile of a flexible record member around the surface of the rotatable transducer mount. Still another object of the invention is to provide an improved flexible record member profile correcting system wherein a vacuum system is utilized to draw off a portion of the laminar air flow, such that the record member profile is brought into a uniform concentric profile around the surface of the rotatable transducer mount.

DESCRIPTION OF PREFERRED EMBODIMENTS

Figures 1, 2, 3:
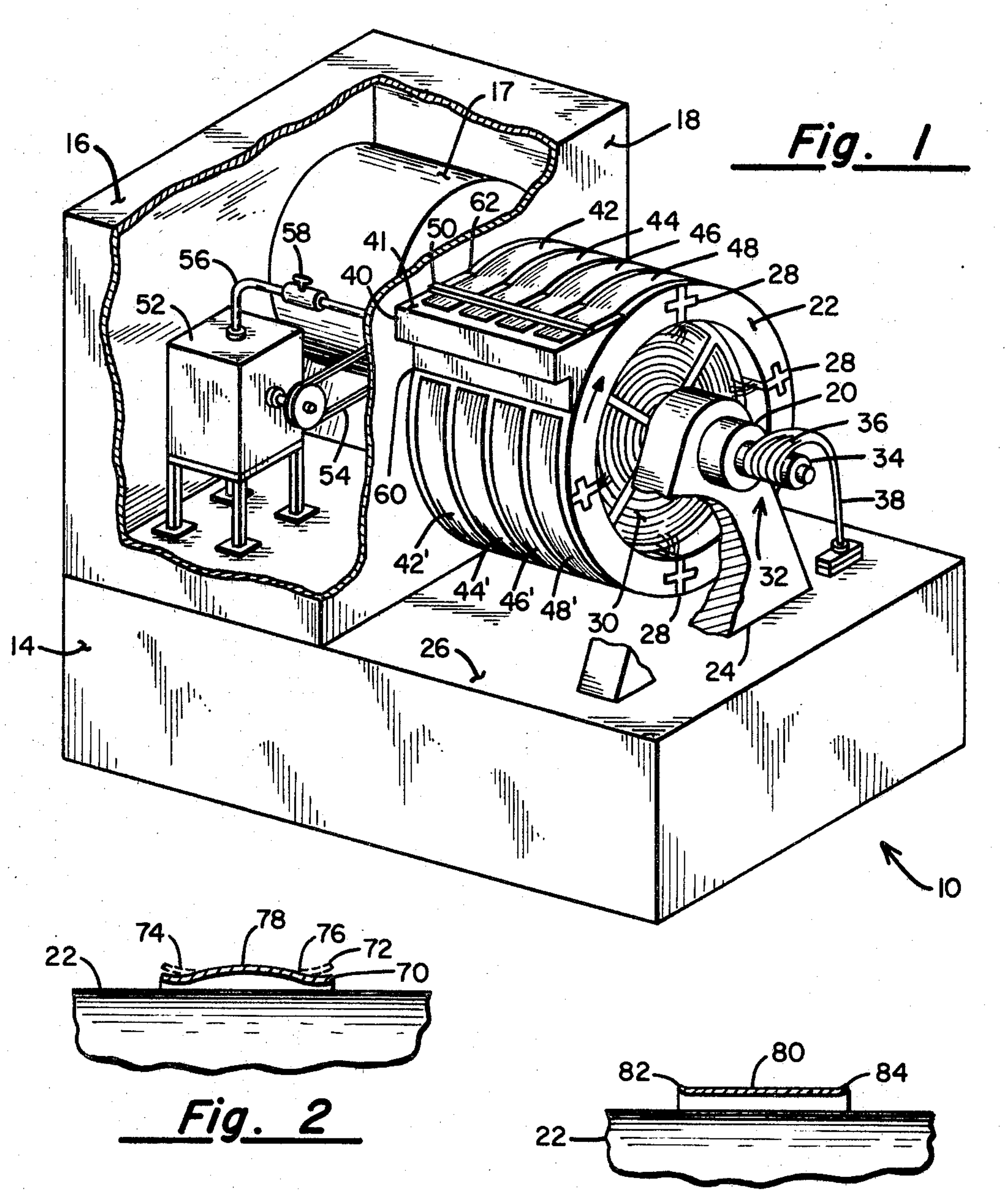
FIG. 1 is a schematic perspective view of a magnetic recording system utilizing rotatable read/write heads and incorporating one embodiment of this invention.
FIG. 2 illustrates a cross-sectional view of a record member utilized in conjunction with a rotatable support member without a profile correction system.
FIG. 3 illustrates a cross-sectional view of a flexible record member utilized in conjunction with a rotatable transducer support member but with a record member profile correction system.

FIG. 1 is a schematic perspective view of a magnetic recording system which illustrates the environment in which this invention is to operate. The magnetic memory system is shown generally as 10 and includes a housing 14 for the electronic circuitry that it utilized in the reading and recording of information and in the addressing of specified memory registers in the memory system. This electronic circuitry is not a part of the invention and will not be shown in detail. A second portion 16 shown broken away houses a drive motor 17. Mounted to one wall 18 of housing 16 is a shaft 20 that extends through and supports cylindrical rotor 22. A characteristic rotor can be 10½ inches in diameter and about 20 inches in diameter and about 20 inches in length when used with four record members of the type described below. Of course these dimensions are purely illustrative, and length and diameter can be chosen to suit the particular design requirements desired. Shaft 20 is rotatably mounted at wall 18 and by support member 24 which in turn is supported by the upper surface 26 of housing 14. Support member 24 is shown partially broken away to better illustrate the configuration of rotor 22.

Rotor 22 is utilized to support a plurality of read/write transducers, also referred to as read/write heads, along the length of the rotor. For the embodiment shown, the read/write transducers are shown at the end of the rotor 22 and are referred to as 28. Located internal to the rotor 22 is the electronic circuitry for performing the head selection for accessing a desired portion of the memory. This head selection circuitry is illustrated as element 30, but will not be shown in detail. The head selection circuitry 30 is mounted on doughnut-shaped support members and mounted around shaft 20. That is, the support members are circular with a predetermined thickness and with a center portion cut out. The coupling of the address selection signals into the head selection circuitry 30 and the reading of information of the memory system to a utilization device is by way of a coupling 32. This coupling can be a slip-ring coupling and can be, for instance, a set of mercury slip-rings having a rotatable portion 34 associated with the sliding contact portions 36, which in turn are coupled into cable 38 for connection to the electronic circuitry in housing 14. The drive motor 17 in housing 16 is coupled to the rotor by conventional means such as a direct drive, a belt-drive, or the like, and causes it to rotate at a rate of up to 7200 revolutions per minute. Also mounted to wall 18 is the vacuum shoe 40 which extends across the length of rotor 22. Resting on the upper surface 41 of vacuum shoe 40 are first ends of four record members 42, 44, 46, and 48, each of which comprises a support member of flexible material coated with a magnetic surface on at least one side thereof. The magnetic surface is faced downwardly toward the outer surface of rotor 22. First ends of record members 42, 44, 46 and 48 are clamped between the surface 41 of vacuum shoe 40 and a clamping member 50 thereby securely holding the end of the record members. The record members are extending around the rotor in the direction of rotation with record member ends 42′, 44′, 46′ and 48′ unrestrained.

Due to the speed of rotation of rotor 22, there is developed at the outer surface thereof a flow of air which extends to support the record members just out of contact with the outer surface and additionally tends to cause the record members to wrap around the surface of the rotor. While four record members have been shown, limitation thereto is not intended since the number can be chosen from one to as many for which switching circuitry can be provided. Characteristic dimensions for the record member strips are 4½ inches wide by 5 mils in thickness, and of a length to encircle a portion of rotor 22. Characteristically, the record members can be made from a Mylar base coated with a nickel-cobalt layer for recording. The foregoing is in general terms to establish the environment in which the subject invention is to be utilized. A more detailed description of the system set forth above will be found in copending patent application of G. J. Thalt, et. al., with the Ser. No. 695,500, filed Jan. 3, 1968.

Also enclosed in housing 16 is a vacuum pump 52, of a type available commercially. The vacuum pump is coupled to the motor drive of motor 17, for instance by belt coupling 54, thereby being driven by the same prime mover as rotor 22. The vacuum pump 52 is coupled to the vacuum shoe 40 through wall 18 by means of hose 56. The vacuum hose 56 has a control valve 58, of a type readily available commercially, in the line such that the vacuum pressure in the vacuum shoe 40 can be adjusted. Depending upon the physical dimensions of the magnetic record members 42, 44, 46, and 48, the pressure in the vacuum shoe can be adjusted to derive the desired record member-to-rotor spacing. With the rotor dimensions and magnetic record member dimensions mentioned above, a proper operation has been achieved with a vacuum in chamber 40 of approximately one to four inches of mercury. Depending upon the degree of smoothness of the outer surface of rotor 22, the spacing of the record media to the surface of the rotor can be brought as close as the smoothness will permit without making physical contact. Reliable operation with a substantially uniform record member-to-rotor spacing of approximately 0.003 inch has been achieved. Since the rotor 22 rotates in the direction shown by the arrow on the end thereof, edge 60 will be considered to be the leading edge, and edge 62, beneath the record members, will be considered to be the trailing edge of vacuum shoe 40. A characteristic spacing of the leading and trailing edges from the surface of rotor 22 can be approximately 0.005±.001 inch. Of course the closer the rotor 22 is to a perfect circle, the closer this spacing of the vacuum shoe to the surface of the rotor can be. It has been found, also, that the closer the spacing of the vacuum shoe 40 to the surface of the rotor 22, the lower the capacity of the vacuum pump 52 required. This comes from the fact that there is leakage around the edges of vacuum shoe 40 which introduces air currents into the vacuum shoe chamber which must also be withdrawn by the vacuum pump 52 in addition to the portion of the air flow that is desired to be removed from beneath the surfaces of record members 42 through 48. The various configurations of the vacuum shoe 40 will be described in more detail below. It has been found that once adjusted for certain selected record members, the vacuum in vacuum shoe 40 tends to hold the record member-to-rotor spacing constant within allowable tolerances. Should it be desirable to provide a continuous monitor of the spacing, a servo system including sensors for sensing the spacing along with control for opening or closing a valve such as valve 58 automatically could be provided. Since the adjustment described above is adequate, a detailed showing of such a servo control system will not be made.

FIG. 2 illustrates a cross-sectional view of a record member utilized in conjunction with a rotatable support member without a profile correction system. The record member profile 70 shown in solid lines illustrates a record member having a stiffness less than that of the record member 72 shown in dotted line. It will be noted that both record members are deflected at the edges upward away from the surface of rotor 22, but that the stiffer the material of the record member, the closer to the center of the record member are the deflection valleys 74 and 76. The bowing of the record members near the center 78 thereof, is caused primarily by the air that is trapped beneath the surface of the record member. It is to correcting this profile that this convention is directed.

FIG. 3 illustrated a cross-sectional view of a flexible record member utilized in conjunction with a rotatable transducer support member but with a record member profile correction system of the type described herein. In this figure, the record member 80 can be seen to be substantially parallel across its width to the surface of the rotor 22. It will be noted that edges 82 and 84 are just slightly turned outward away from the surface of the rotor. This is due to the anti-elastic curvature mentioned above. It will be noted however that this very slight deflection of edges 82 and 84 with the profile correction system described herein is within tolerances which can be handled by the read/write circuits.

Figure 4:
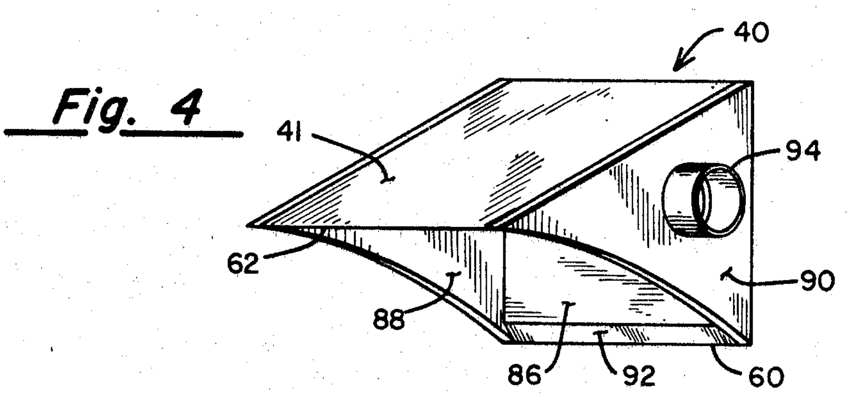
FIG. 4 is a perspective view of one embodiment of a vacuum shoe which can be utilized to draw off a portion of the laminar flow of air.
Figure 5A:
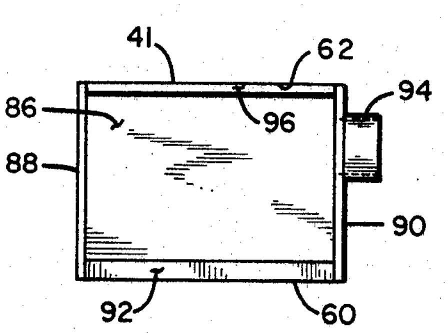
FIGS. 5*a* and 5*b* are respectively a front view and a side view of one embodiment of the invention.
Figure 5B:
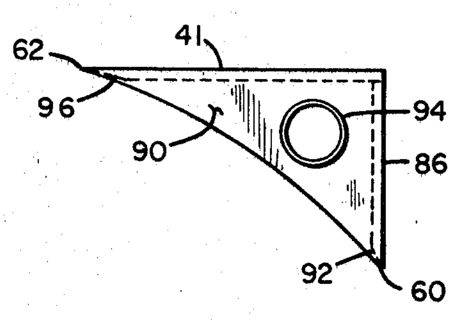
Figure 6A:
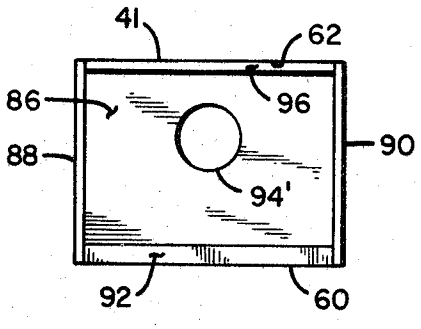
FIGS. 6*a* and 6*b* are respectively a front view and a side view of a second embodiment of the invention.
Figure 6B:
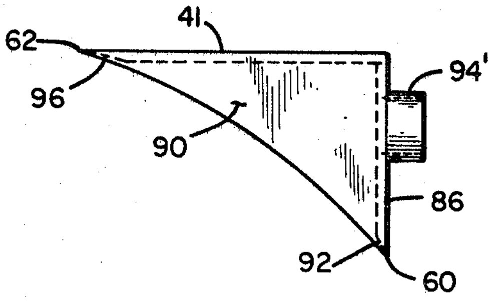

FIG. 4 is a perspective view of one embodiment of a vacuum shoe that can be utilized to draw off a portion of the flow of air in a system such as shown in FIG. 1. The vacuum shoe 40 has an upper plate member 41 having an edge 62, previously referred to as the trailing edge, that is coupled at the opposite extremity to wall 86. For the embodiment shown, a pair of side walls 88 and 90 form an enclosure with the top plate 41 and the rear wall 86. It will be noted that the radius of curvature of the lower edges of sides 88 and 90 is such that it forms an arc concentric with the outer peripheral surface of a rotor with which the vacuum shoe 40 will be associated. In order to achieve the closest possible spacing of the vacuum shoe 40 to the surface of the rotor, the lower portion 92 of rear wall 86 is bevelled to an edge 60, previously referred to as the leading edge. For this illustrated embodiment, side wall 90 is provided with a coupling port 94 that is utilized to pass through wall 18 and is coupled by way of conduit 56 to the vacuum pump 52. It will, of course, be noted that wall 90 need not be included if means are provided, for instance a portion defined by the dotted lines, for coupling directly to wall 18.

Turning now to a consideration of FIGS. *5a* and *5b*, which are respectively a front view and a side view of the vacuum shoe 40 illustrated in FIG. 4, the elements mentioned above are shown with the same reference numerals as those just described. In addition, the upper plate 41 will be seen to be provided at the leading edge 62 with a bevelled portion 96. Again, this bevelled portion 96 is provided since the upper member 41 has a finite thickness, for allowing the vacuum shoe 40 to be spaced as closely as possible to the surface of the rotor.

In FIGS. *6a* and *6b* there are shown respectively a front view and a side view of an alternative configuration for the vacuum shoe. Portions that have a similar function bear the same reference numerals. The only difference between this vacuum shoe and the vacuum shoe illustrated in FIGS. 4, and *5a* and *5b*, is that the vacuum port 94' is located in the rear wall 86 rather than in the side wall 90 as in the other configuration. The purpose for this alternative embodiment, is to provide a system wherein the pressure gradient from one end of the rotor to the other is essentially eliminated. Such a configuration can be utilized with a rotor having a substantial length so that the bleeding off of the air would tend to be more uniform across the entire length of the drum than would be possible with the vacuum port in the end of the vacuum shoe. A primary requirement for choosing the configuration of the vacuum shoe 40 is that the vacuum shoe outlet port must not be flow-restricted. Of course for very long rotors, multiple ports in the rear wall could be utilized.

Figure 7:
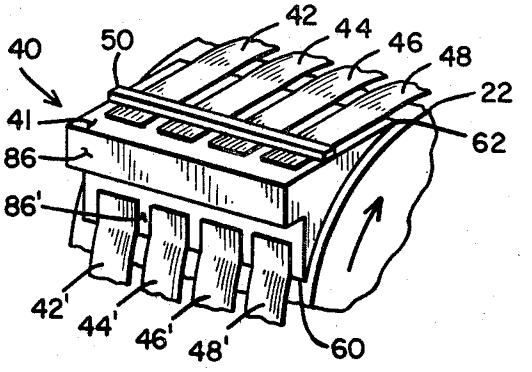
FIG. 7 is a perspective view of an alternate embodiment of the vacuum shoe of this invention.

Turning now to a consideration of FIG. 7, which illustrates a broken away portion of a rotor 22 and an alternative arrangement of a vacuum shoe 40, it will be seen that the ends of record members 42, 44, 46, and 48 are clamped to the upper surface 41 of vacuum shoe 40 by clamping means 50. The primary difference of this vacuum shoe and record member arrangement is that the rear wall 86 is provided with a portion 86' that is curved in the direction of rotation of the rotor. The free ends 42', 44', 46' and 48' ride up on surface 86'. This arrangement of the free ends of the record members provides a partial seal at the leading edge 60 of the vacuum shoe 40, whereby the vacuum requirements tend to be minimized. Additionally, in very long record member arrangements wherein the record members extend entirely around the surface of the rotor 22, the vacuum pressure can be such that it will cause the record members to be deflected toward wall 18, when the arrangement is such as illustrated in FIG. 1. However, when the ends of the record member are lapped onto surface 86', it can be seen that there is a frictional relationship between the record members and surface 86' and that the vacuum provided through conduit 56 tends to hold the record members at the free ends tightly against surface 86'. This tends to hold the record members in their proper alignment entirely around the surface of the rotor.

CONCLUSION

From the foregoing detailed description of this invention along with the description of alternative embodiments thereof, it can be seen that a magnetic memory system is shown wherein a rotatable mounted set of read/write transducers can operate with flexible record member strips supported on a layer of air. By providing a controlled vacuum system for bleeding off a portion of the flow air from beneath the surface of the record members, the record member profiles are corrected such that the record members form configurations substantially parallel to the surface of the rotor. In light of this discussion and description, it can be seen that the foregoing stated objectives and purposes of the invention have been fully met. Having now, then, fully described the invention, and recognizing that various details and modifications will become apparent to those skilled in the art without departing from the spirit of the invention, what is intended to be protected by Letters Patent is defined in the appended claims.

We claim:

1. In a magnetic storage system adapted for reading from and recording information on flexible record members, a record member profile correction system comprising: housing means; rotatable transducer support means rotatably coupled to said housing means and having a predetermined length and a substantially cylindrical shape, said support means adapted for rotation in a predetermined direction, and including an outer surface for cooperating with a flexible record member and operative to support the flexible record member on a boundary layer of air when rotated; transducer means mounted in said support means and having a portion thereof exposed at said outer surface for cooperation with said record member; and profile correction means mounted on said housing means and pneumatically associated with a portion of said outer surface for removing a portion of said boundary layer of air that would otherwise flow beneath the flexible record member, correcting the profile of the record member around said outer surface, and supporting said flexible record member on said boundary layer of air out of contact with said outer surface and said transducer means.

2. A system as in claim 1 and further including control means coupled to said profile correction means for providing a selectively alterable control of the amount of said boundary layer of air to be removed, thereby controlling said profile of the record member and the spacing of the flexible record member from said outer surface.

3. A profile correction system as in claim 1 wherein said profile correction means includes: vacuum shoe means for mounting in an operational proximity to a predetermined portion of said outer surface, but out of contact therewith, said vacuum shoe means including coupling means for coupling to a vacuum pump for carrying at least a portion of said boundary layer of air away from said outer surface as said outer surface moves past said vacuum shoe means, whereby said profile of the associated flexible record member is corrected for cooperative operation with said transducer means.

4. A profile correction system as in claim 3 and further including control means coupled to said coupling means for providing a selectively alterable control of the amount of said boundary layer of air to be removed.

5. A system as in claim 4 wherein said vacuum shoe means comprises a housing having first and second wall members, each having first and second ends, said first wall member having first and second edges, said first edge for being disposed parallel to and in a spaced apart position from said outer surface, said second wall member having third and fourth edges with said third edge coupled to said second edge and said fourth edge for being disposed parallel to and in a spaced apart position from said outer surface, said first and second wall members having predetermined length and width dimensions; a first end wall member coupled respectively along first and second edges to said first ends; and a second end wall member coupled respectively along first and second edges to said second ends, said first and second end wall members each having a third curved edge for cooperating with only a portion of said outer surface as said transducer support means is caused to rotate under said vacuum shoe.

6. A system as in claim 5 wherein said first and fourth edges are bevelled for permitting optimization of adjustment of said operational proximity of said vacuum shoe to said outer surface.

7. A system as in claim 5 wherein said coupling means includes an aperture in at least one of said wall members; and tubular coupling means coupled to said one of said wall members around said aperture.

8. A system as in claim 7 and further including vacuum pump means for drawing a vacuum, said vacuum pump means including an inlet port; and tubular means having a first end coupled to said inlet port and a second end coupled to said tubular coupling means, the arrangement being such that a predetermined portion of said boundary layer of air can be drawn off from said outer surface through said tubular means by said vacuum pump means.

9. A system as in claim 1 wherein said profile correction means includes vacuum shoe means for coupling a vacuum source to said boundary layer of air.

10. A system as in claim 9 further including means for securing only one end of said flexible record member to said housing means and leaving the other end of said flexible record member free to float on said boundary layer of air.

References Cited

UNITED STATES PATENTS

| | | | |
|---|---|---|---|
| 3,327,916 | 6/1967 | Weidenhammer et al. | 340—174.1 |
| 3,418,434 | 12/1968 | Groenowegen | 340—174.1 |
| 3,422,411 | 1/1969 | Smith | 340—174.1 |

OTHER REFERENCES

"Pneumatic Drum," by Auyang, IBM Tech. Disc. Bulletin, vol. 3, No. 12, May 1961.

STANLEY M. URYNOWICZ, Jr., Primary Examiner
V. P. CANNEY, Assistant Examiner

U.S. Cl. X.R.

226—95